(12) United States Patent
Balasubramanian

(10) Patent No.: US 12,244,510 B2
(45) Date of Patent: Mar. 4, 2025

(54) DIRECTIONAL FLOW BASED MTU MANAGEMENT

(71) Applicant: Celona, Inc., Campbell, CA (US)

(72) Inventor: Srinivasan Balasubramanian, San Diego, CA (US)

(73) Assignee: Celona, Inc., Campbell, CA (US)

( * ) Notice: Subject to any disclaimer, the term of this patent is extended or adjusted under 35 U.S.C. 154(b) by 300 days.

(21) Appl. No.: 17/990,599

(22) Filed: Nov. 18, 2022

(65) Prior Publication Data

US 2023/0155948 A1 May 18, 2023

Related U.S. Application Data

(60) Provisional application No. 63/281,003, filed on Nov. 18, 2021.

(51) Int. Cl.
*H04L 12/26* (2006.01)
*H04L 45/74* (2022.01)
*H04L 47/36* (2022.01)
*G06F 11/07* (2006.01)

(52) U.S. Cl.
CPC .................................. *H04L 47/36* (2013.01)

(58) Field of Classification Search
CPC ......... H04L 47/36; H04L 45/74; H04L 12/26; G06F 11/07
USPC ....................................................... 709/238
See application file for complete search history.

(56) References Cited

U.S. PATENT DOCUMENTS

2015/0288603 A1* 10/2015 Kandasamy ........ H04L 63/0272
370/392
2022/0103473 A1* 3/2022 Talwar .................... H04L 45/26

OTHER PUBLICATIONS

Krishnaswamy, Vijayaraghavan, "Dynamic MTU Management in an Enterprise Network", patent application filed in the USPTO on Nov. 11, 15 for U.S. Appl. No. 17/985,478, 40 pgs.

* cited by examiner

*Primary Examiner* — Jude Jean Gilles
(74) *Attorney, Agent, or Firm* — Jaquez Land Greenhaus & McFarland, LLP; Bruce W. Greenhaus

(57) ABSTRACT

A system and method are provided in which a first MTU (maximum transmission unit) size is determined messages traveling in a first direction along a path. A second MTU size is determined for messages traveling in a second direction along the same path. Messages are sent in the first and second directions based on the first and second MTU size, respectively. In some embodiments, different sizes are chosen for the DL MTU and the UL MTU. In some embodiments, triggers are used to proactively change the MTU size with network conditions. In some embodiments, packet segmentation may be performed at the eNB/gNB. In some embodiments, mobility support is provided with packet segmentation. In some embodiments, dedicated bearers are pre-established that support specific MTU sizes. In some embodiments, the SDAP (service data adaptation protocol) may announce the MTU size to use for a given flow on the UL.

1 Claim, 11 Drawing Sheets

DIRECTIONAL FLOW BASED MTU MANAGEMENT

CLAIM OR PRIORITY TO PREVIOUSLY FILED PROVISIONAL APPLICATION—INCORPORATION BY REFERENCE

This utility application claims priority under 35 USC section 111 (b) and under 35 USC section 119 (e), to earlier-filed provisional application No. 63/281,003 filed Nov. 18, 2021, entitled "Directional Flow Based MTU Management"; and the contents of the above-cited earlier-filed provisional application (App. No. 63/281,003) is hereby incorporated by reference herein as if set forth in full.

BACKGROUND

(1) Technical Field

The disclosed method and apparatus relate generally to systems for network communications. In particular, the disclosed method and apparatus relate to directional flow based MTU size management.

(2) Related Applications

Application Ser. No. 17/985,478, filed Nov. 11, 2022, entitled "Dynamic MTU Management in an Enterprise Network" and is hereby incorporated by reference in its entirety.

(2) Background

It is commonplace today for the MTU (max transmit unit) of IP (Internet Protocol) packets and the MSS (max segment size) of TCP (Transmission Control Protocol) connections to be negotiated on an end-to-end manner and in a bi-directional manner. Currently, the MTU size is provided from the enterprise packet core to the UE (User Equipment) when establishing the PDN/PDU (packet data network/protocol data unit) session and remains fixed for all flows within the PDN/PDU. A given flow is restricted by the MTU sizes used on the individual hops on the end-to-end path.

The system operations are determined by "hop-to-hop capacity management", which impacts the performance of an individual UE or EUD (User End Device) as well as the aggregate system performance. The terms EU and EUD are essentially interchangeable. However, EU is typically used to refer to the subscriber device in a cellular network, such as 4G LTE (Long Term Evolution) or 5G NR ($5^{th}$ Generation New Radio) network. In contrast, "EUD" is typically used to refer to the subscriber unit in a CBRS (Citizen's Band Radio Network) network. For the remained of this disclosure, the term UE is used to refer to any device that communicates wirelessly with a BS/AP (Base Station/Access Point). A BS/AP may be any AP (access point), such as a Wi-Fi AP, or any node B, such as an eNB (Evolved NodeB) of an LTE network or a gNB (gNodeB) of a NR network.

Packet segmentation and reassembly on the hops across the network nodes have capacity implications (i.e., have an impact on the capacity of the network) that apply to the link between far-end servers and the enterprise packet core network, as well as between the enterprise packet core network and the eNB/gNB.

Hop-to-hop capacity management is also affected by packet segmentation and reassembly when transmitting the packets over-the-air between the CPE (consumer premises equipment) and the UE. The selection of the MTU size can result in packet segmentation and reassembly on the individual hops along the entire end-to-end path, (e.g., the path from the UE to the network core and through to Internet and any servers supporting applications to which the UE is connected through the network core).

There is a tradeoff between maximizing the MTU size (which serves to increase the efficiency for each packet that successfully traverses the network) and reducing the MTU size (which serves to increase efficiency over the network when errors in transmission cause frequent packet retransmissions to occur). That is, increasing the MTU size will increase the segmentation and reassembly in the hops along a path through the network node. However, if the links have sufficient capacity to manage the increased size, segmentation, and reassembly, this aspect can be ignored. Having a larger MTU size typically increase the payload to overhead ratio of each packet. That is if a larger MTU is used, the same size packet header can be used to transmit a payload with more data. However, increasing the MTU size also increases the need to retransmit messages at the PDCP (packet data convergence protocol) layer, since errors are more likely to occur in larger packets. This becomes pronounced in poor radio conditions and during mobility scenarios. In addition to the likelihood of errors occurring, the amount of data that has to be retransmitted is greater if the packets are larger, since the entire large packet has to be retransmitted, even if a relatively small number of uncorrectable errors occur in the packet.

FIG. 1 is an illustration of the manner in which content is encapsulated and headers are provided for each such encapsulation. For the purposes of this disclosure, a packet is defined as a payload with a header. A packet that originates in a server 102 might comprise an IP header 106 and an IP payload 108. The IP payload 108 comprises a TCP header 110 and the a TCP payload 112 with data to be transmitted to an end user, such as an UE 104. Therefore, it can be said that an inner TCP packet has been encapsulated in the outer IP packet. When the transmission arrives at the UE 102, the UE 102 receives the IP packet 102 with the encapsulated TCP packet 108 as its payload.

The IP packet is transmitted to an EPC (Evolved Packet Core) as an IPSec (IP Secure) packet 114. Each IPSec packet 114 comprises the IP packet 102 which is encapsulated within a SCTP (session control transport protocol) packet 116. The SCTP packet 116 has an SCTP header 118 and an SCTP payload 120. Accordingly, the SCTP payload 120 comprises the IP packet 102. The SCTP packet 116 is further encapsulated within the IPSec (IP secure) packet by applying an IPSec header 121 to the SCTP packet 116.

Within the EPC/5GC, the IPSec packet 114 and SCTP packet 116 are opened (i.e., the associated headers are removed) to gain access to the IP packet 102. Received IP packets 102 are then each encapsulated in an PDCP (Packet Data Conversion Protocol) 122 packet by applying a PDCP header 124 to each of the received IP packets 102. Each PDCP packet 126 can then be fragmented into several "segments". Each segment is placed into the payload 128 of an RLC (Radio Link Control) packet 130. The lines 132 between the PDCP packet 122 and the RLC payloads 128 indicate that the distinctions between various the types of bytes within the PDCP packet 122 are not relevant when fragmenting the PDCP packet 122. That is, a segment 128 can be formed from some bytes of the PDCP header 124, some bytes of the IP header 106 that follows the PDCP header 124, and some bytes of the IP payload 108 that follow the IP header 106. The RLC packets 126 are then grouped together and encapsulated within a MAC (Media Access Control) packet 134 by adding a MAC header 136. MAC packets 134 can then be transmitted to a UE 104 where the payload of the MAC packets 134 are unencapsulated and the fragments of the IP packets 102 are reassembled.

FIG. 2 illustrates the nested encapsulation of the various payloads.

The size of MAC packets will be dependent upon the MTU size negotiated between the EPC/5GC and the UE 104. In light of the tradeoffs noted above, it would be advantageous to provide a system that can more flexibly choose the MTU or MSS, to improve transmission capacity and performances of individual UE as well as improve the aggregate system performance.

SUMMARY

Various embodiments of a method and apparatus for supporting choosing an MTU (maximum transmission unit) size based on the direction of transmission are disclosed. In some embodiments, different DL (downlink) MTU and UL (uplink) MTU sizes are chosen independently, based on the capacity for transmitting messages on the DL and UL, respectively. In some embodiments, proactive triggers are used for changing the MTU size during a session based on changes in network conditions. In some embodiments, packet segmentation may be performed at the eNB/gNB (evolved node base/5G node base). In some embodiments, mobility support is provided with packet segmentation, allowing mobile units to perform the segmentation. In some embodiments, dedicated bearers that support specific MTU sizes may be preestablished. A determination is made of the MTU size that is currently desired. The bearer that supports the currently desired MTU size is chosen. In some embodiments, the SDAP (service data adaptation protocol) may announce the MTU size to use for a given flow on the UL.

In some embodiments, independent MTU size settings may be applied only for the wireless links while retaining a single larger MTU size end-to-end. The setting of the MTU size may be provided on a per PDN/PDU connection basis. Also, the MTU size may be adapted to specific bearers, as needed. The required MTU modification may be indicated by the eNB, via the S1/N2 interface, to the MME (mobile management entity) in the EPC (evolved packet core). The UE may be updated with the MTU change through NAS (non-access stratum) procedures. Alternatively, the RRC (radio resource control) Connection Reconfiguration may provide the MTU modification to the UE for a given bearer or set of bearers. The UE may provide the input to the operating system to manage the UL packet sizes. End-to-end MTU requests may be intercepted at the modem layers and responded to by providing the larger of the DL and UL MTU sizes so that the far-end accommodates a larger MTU size when possible.

The modified MTU sizes may be adapted to the radio channel conditions based on the UE measurement reporting, to prevent packet repetitions before their occurrence. The access point (AP) may determine the expected channel performance of the DL and UL, based on UE reports.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
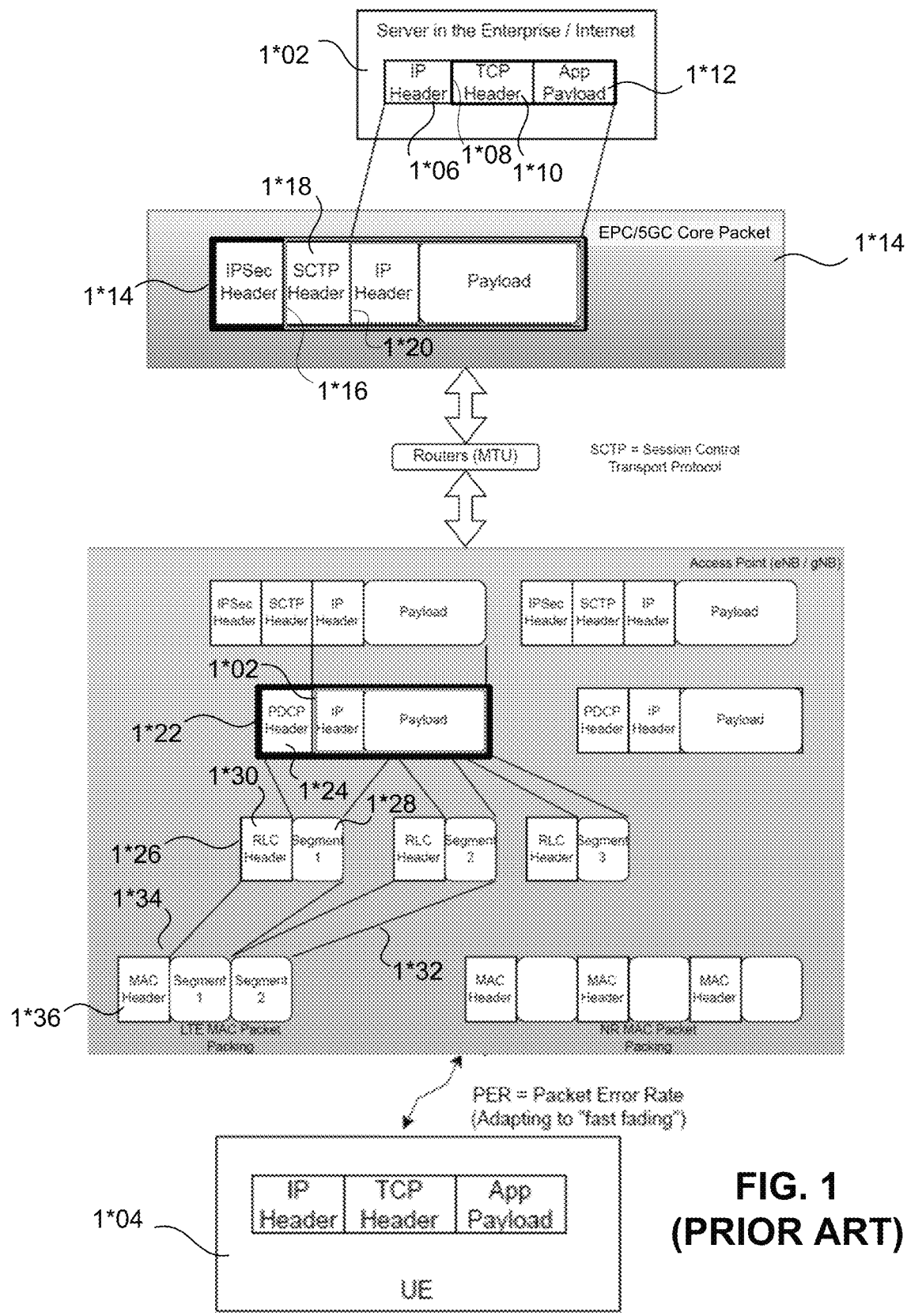
FIG. 1 is an illustration of the manner in which content is encapsulated and headers are provided for each such encapsulation.
Figure 2:
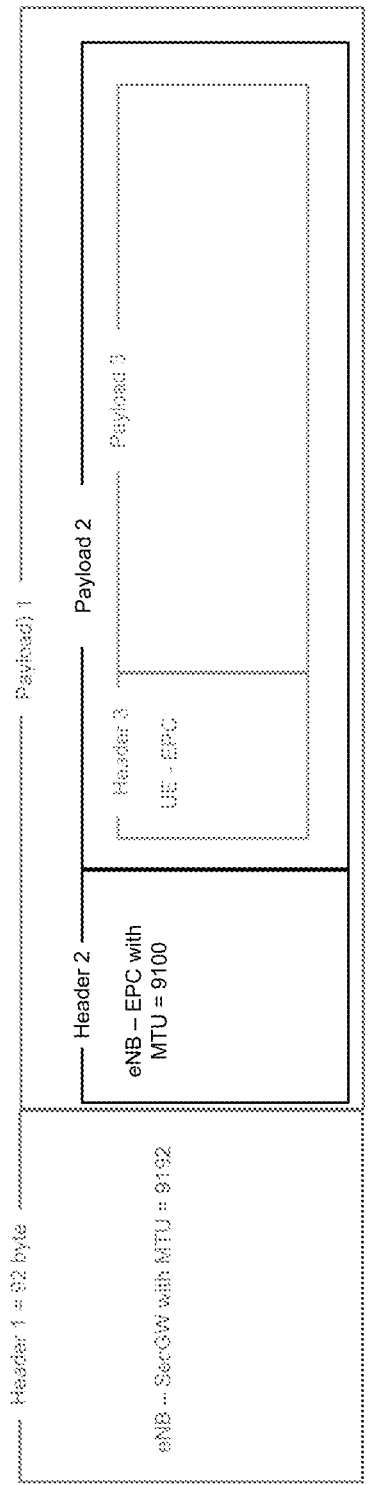
FIG. 2 is a further illustration of the manner in which content is encapsulated and headers are provided for each such encapsulation.
Figure 3:
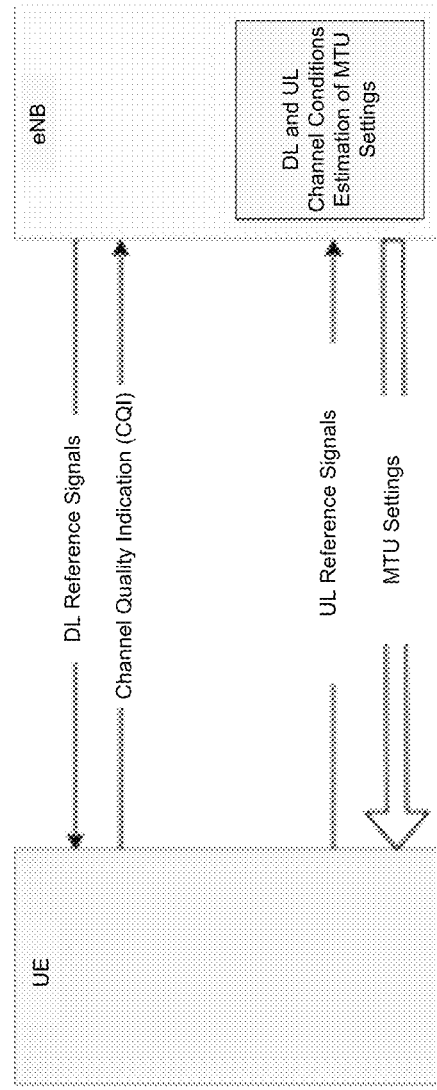
FIG. 3 is an illustration of a system in which the MTU for a channel is set based on UL and DL conditions.

FIG. 3 is an illustration of a system in which the MTU for a channel is set based on UL and DL conditions.

In some embodiments, the system operations are determined by the hop-to-hop capacity management, based on the direction of flow, and may be changed during a session, or for certain legs of a flow to improve the performance of individual UE as well as the aggregate system performance. Supporting an MTU Size on the DL and UL Independently The performance of the DL (downlink) and UL (uplink) can be vastly different for wireless links, unlike a typical wired connection. Tuning the MTU size based on the link performance expectation of DL versus UL will allow for better control and operation of the channel. This flexibility allows for better tunning of the packet reception performance, based on the quality of the link. E.g., LTE (long term evolution) TDD (test driven development) config 2 has only 2 of the 10 slots available for UL transmission while the DL has a much higher capacity allocated to it. Intra-frequency, inter-frequency, and cross-link interference can impact the channel operation, potentially impacting the UL more than DL.

The typical configuration allows for a regular MTU size (e.g., less than 1500 bytes) for the UL while allowing for MTU sizes that can be supported on jumbo frames (e.g., greater than 1500, but less than 9000 bytes)/super-jumbo frames (e.g., more than 9K bytes).

The current "PathMTU" discovery procedure that is run end-to-end between the UE and the server node supports only one MTU size determination on a given link. Given that the hops (other than the wireless hops) tend to be symmetric in behavior, it may be desirably to apply the proposed mechanism by applying independent MTU size setting only for the wireless link while retaining the single larger MTU size end-to-end.

The setting of the MTU size is provided on a per PDN/PDU connection basis. Also, the MTU size may be adapted to specific bearers, as needed.

The required MTU modification is indicated from the eNB to the MME (mobile management entity) in the EPC (evolved packet core). The S1/N2 interface is modified to provide this indication. The UE is updated with the MTU change through NAS (non-access stratum) procedures.

An alternative approach is to use the RRC (radio resource control) Connection Reconfiguration to provide the MTU modification to the UE for a given bearer or set of bearers. This provides the abstraction of MTU management over the radio to the RAN (radio access network) procedures.

The UE, based on the UL MTU size, provides the input to the HLOS (Handset Alliance or Android/iOS) to manage the UL packet sizes.

It may be desirable to have the end-to-end "PathMTU" requests intercepted at the modem layers and responded to by providing the larger of the DL and UL MTU sizes so that the far-end accommodates a larger MTU size when it can.
Proactive Triggers for MTU Size Change MTU size adaptation based on packet retransmission detection both at the IP transport layer and radio link layers tends to be delayed in nature. This is applicable for both increasing or decreasing the MTU size and does not implicitly track the radio channel behavior.

Applying modified MTU sizes adapting the radio channel conditions based on the UE measurement reporting, allows for preventing packet repetitions before their occurrence.

The UE continuously provides channel feedback information through CQI (channel quality indicator) reports for DL packet scheduling. The UE also supports reference signals on the UL—SRS/DMRS (sounding reference signal/demodulation reference signal), which are tracked continuously for UE UL channel performance. This allows for the access point (AP) (eNB/gNB) to determine the DL and UL expected channel performance for the UE on the DL and UL based on filtered measurement information.

The MTU sizes are adapted accordingly using thresholds for switching MTU sizes. For the DL, the IP packets are segmented for transmission when needed to match with the required MTU size. For the UL, the modified MTU size is communicated to the UE (as described in the previous section). The UE ensures that the MTU sizes are propagated to the Android and iOS layers for sizing packets transmitted on the UL.

Figure 4:
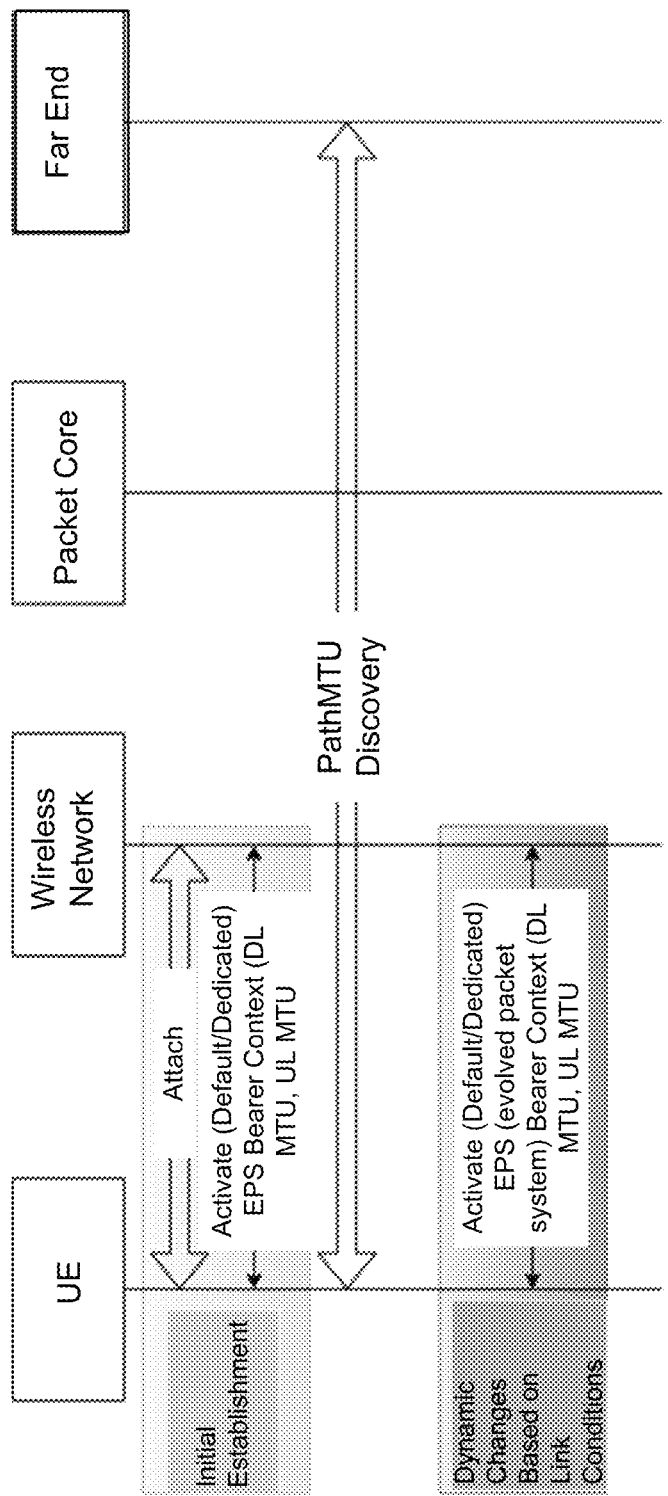
FIG. 4 is an illustration of a system in which the MTU is set based on network conditions associated with a data path between a UE and a far end.
Figure 5:
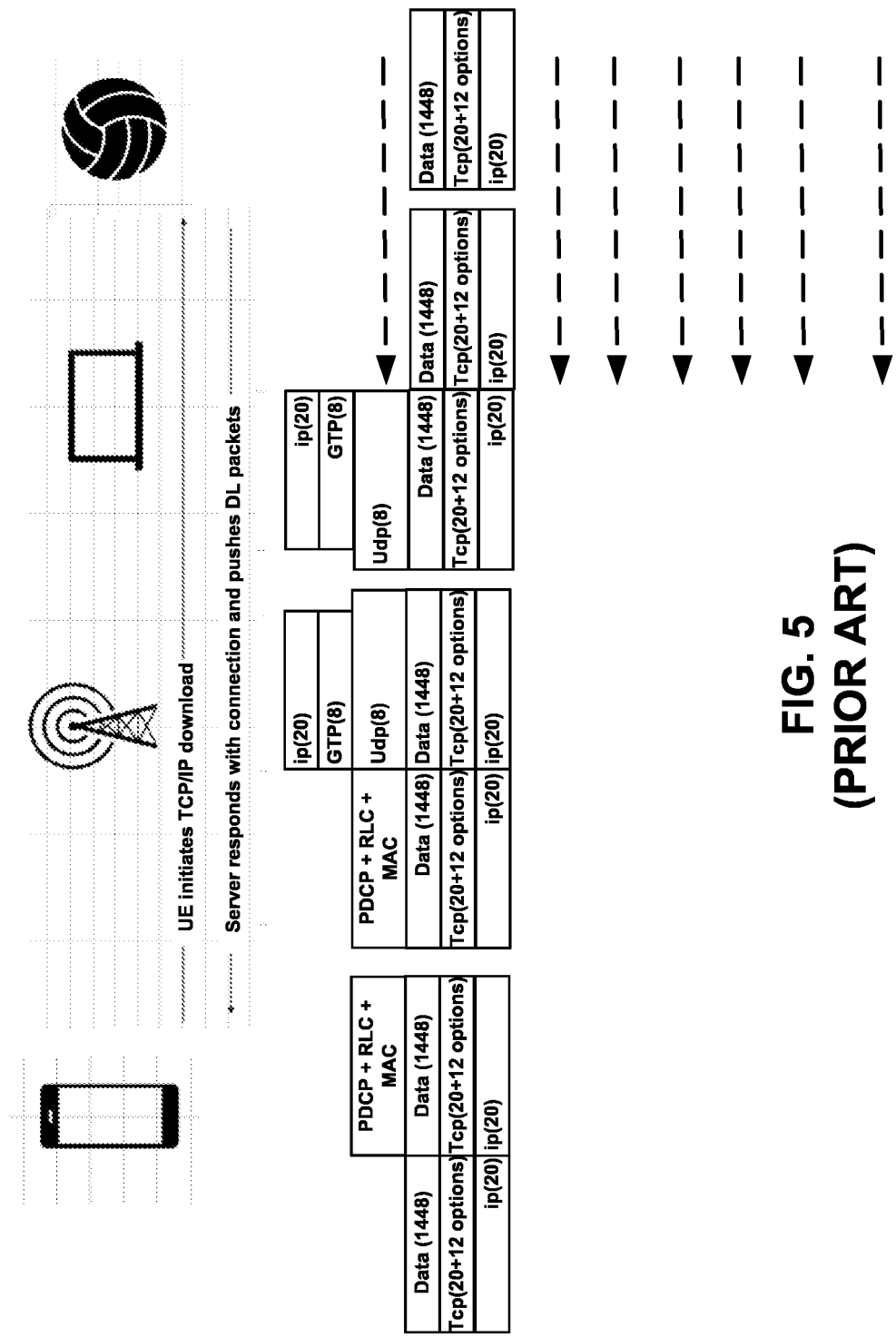
FIG. 5 is an illustration of a network that configures data in 1500 bytes.
Figure 6:
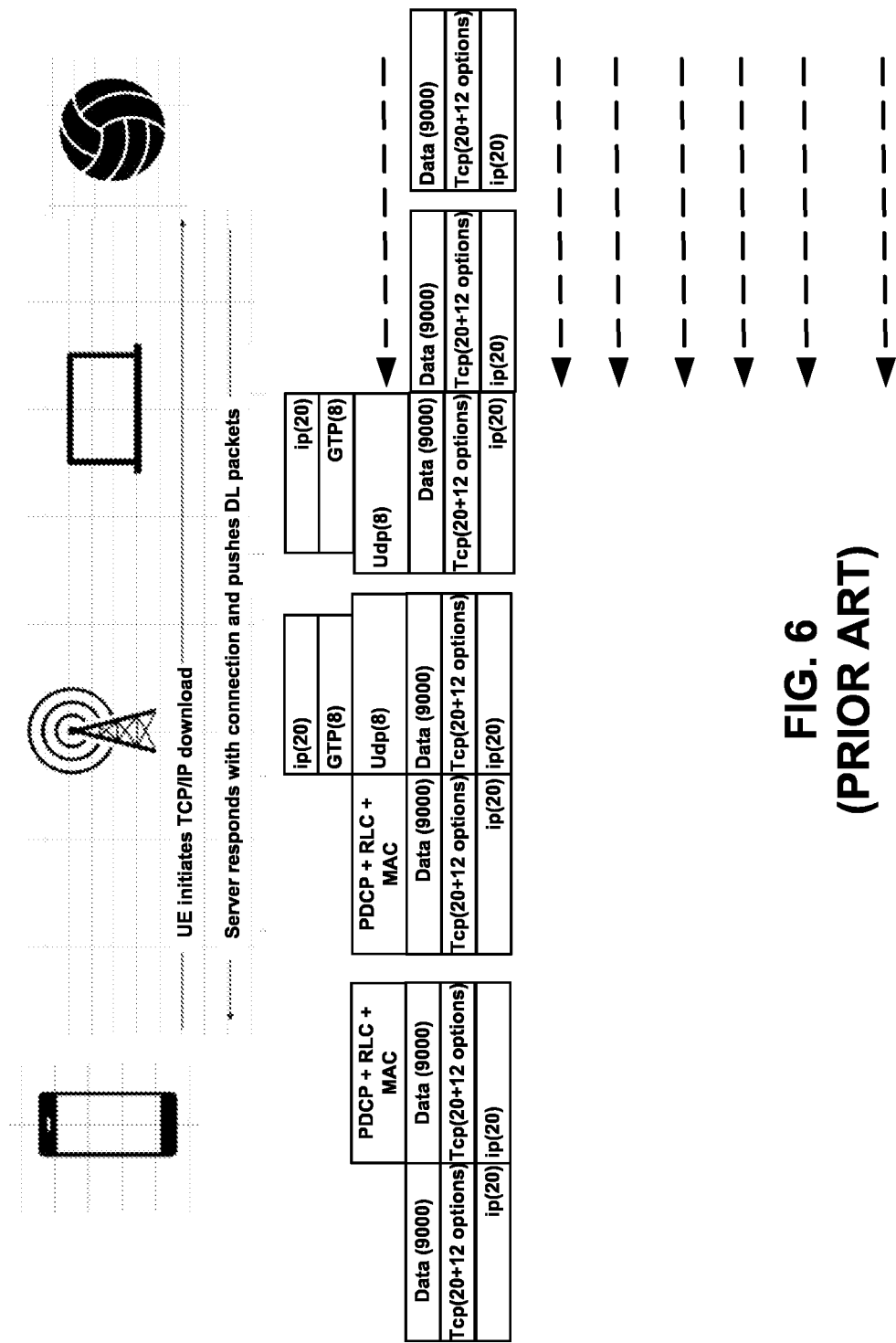
FIG. 6 is an illustration of a network that configures data in 9000 bytes.
Figure 7:
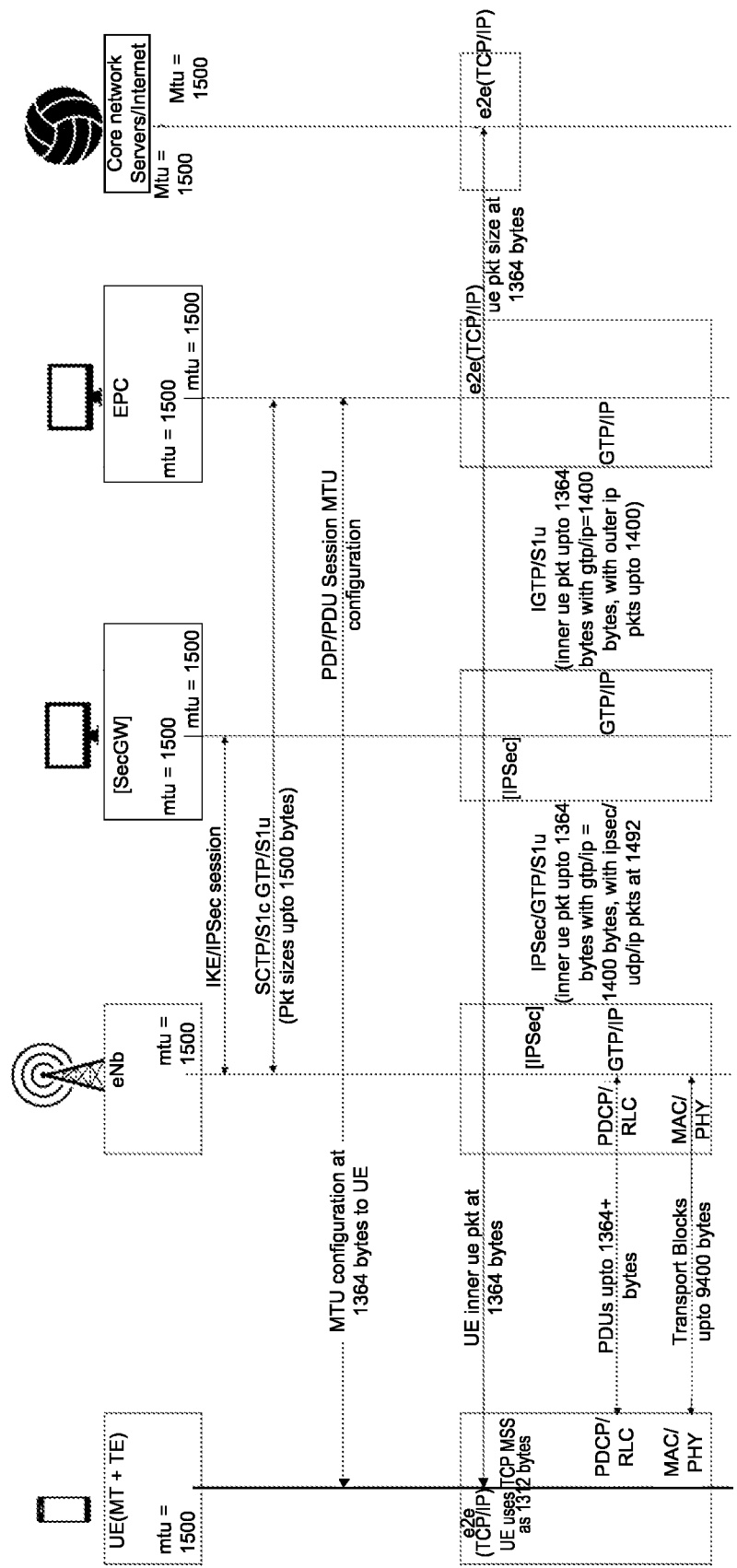
FIG. 7 is an illustration of a network in which the static setting with normal 1500-byte MTU in both core and RAN and typical packet-size transactions used to avoid fragmentation/reassembly at IPv4 level.
Figure 8:
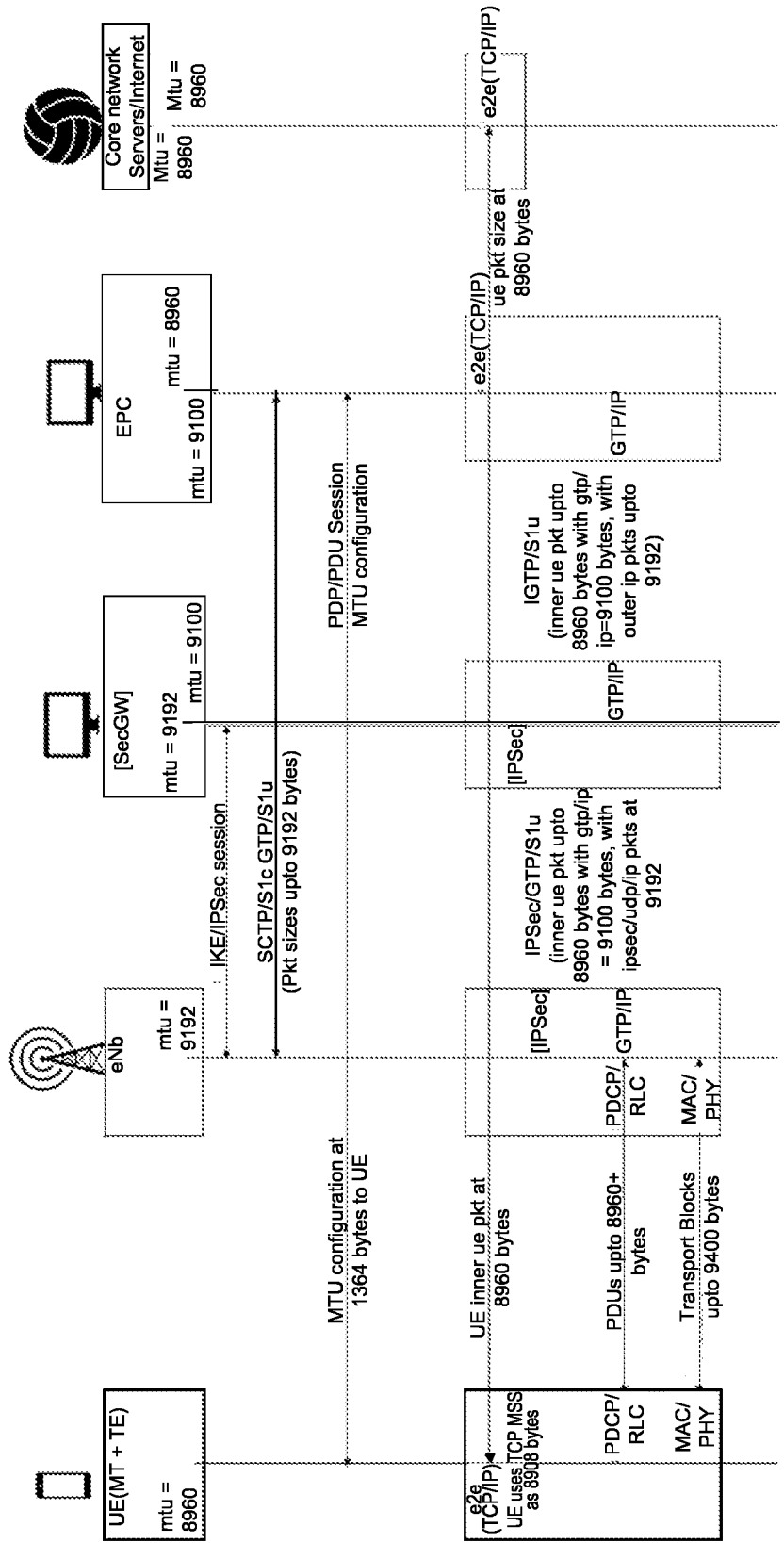
FIG. 8 explains the static setting with higher level 9000-byte MTU in both core and RAN and typical packet-size transactions used to avoid fragmentation/reassembly at IPv4 level.
Figure 9:
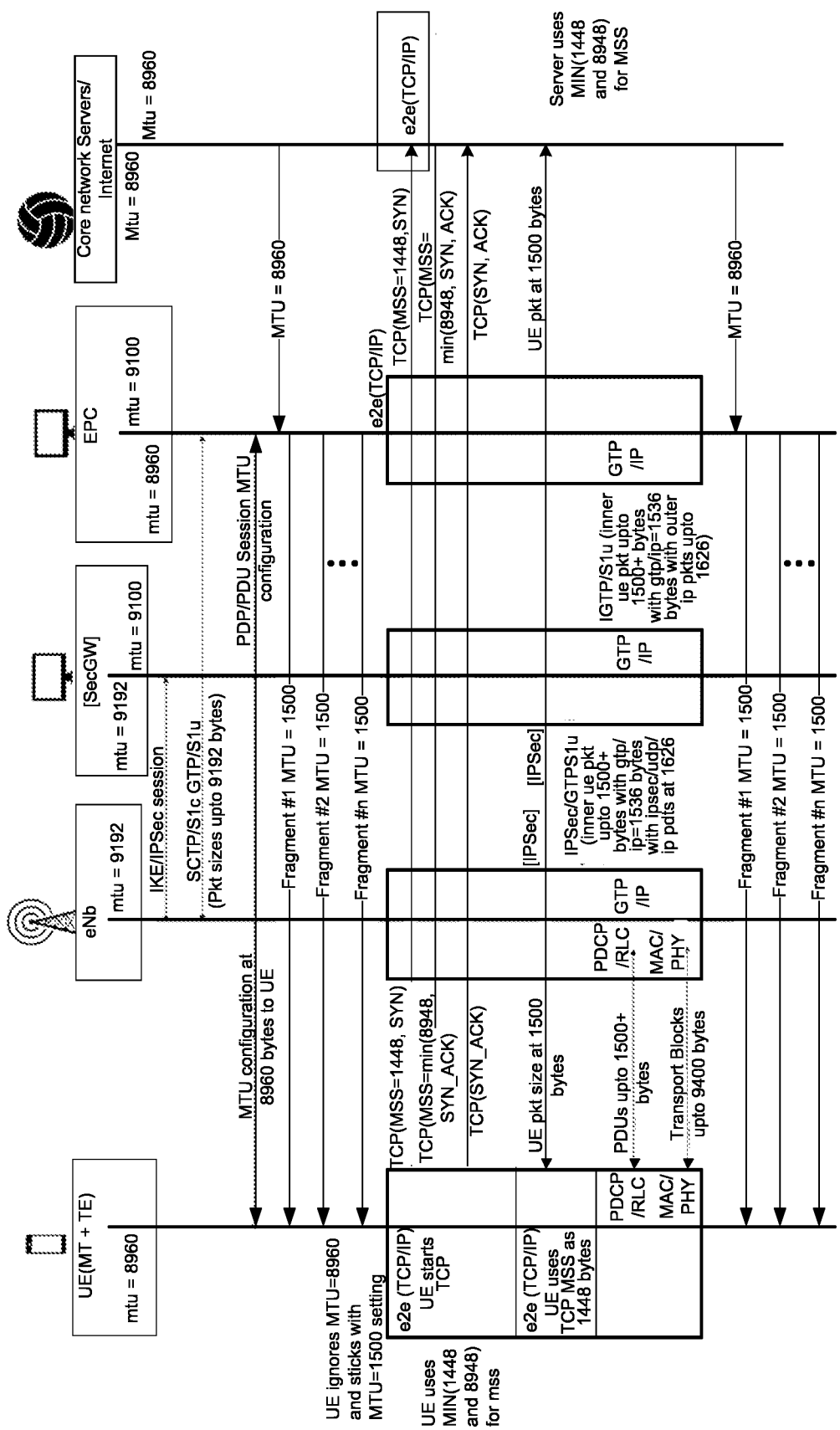
FIG. 9 explains the static setting with higher level 9000-byte MTU in both core and RAN and typical packet-size transactions used to avoid fragmentation/reassembly at IPv4 level.
Figure 10:
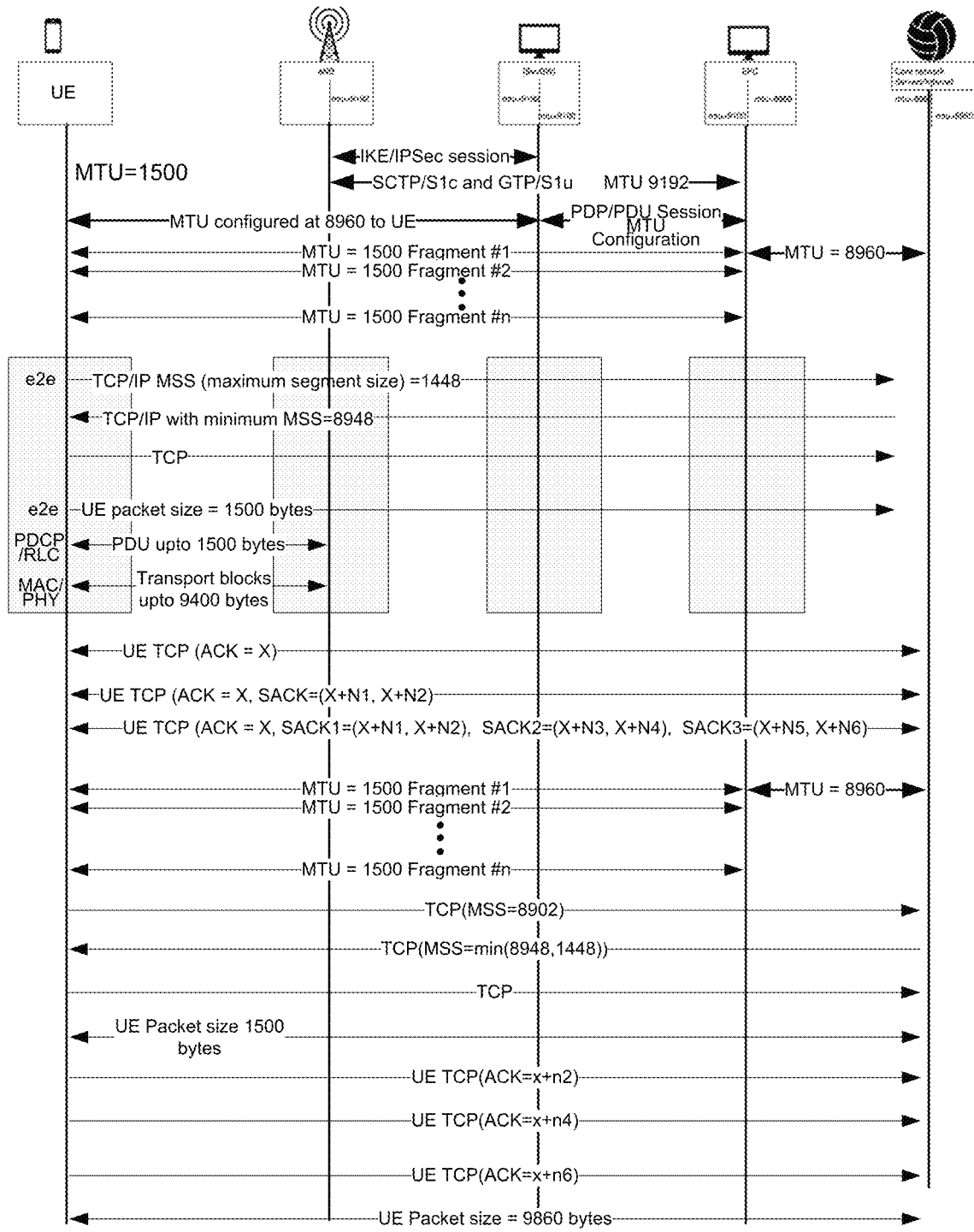
FIG. 10 explains the static setting with higher level 9000-byte MTU in both core and RAN and how dynamically MTU/MSS settings may be adjusted dynamically to different UE/flows.
Figure 11:
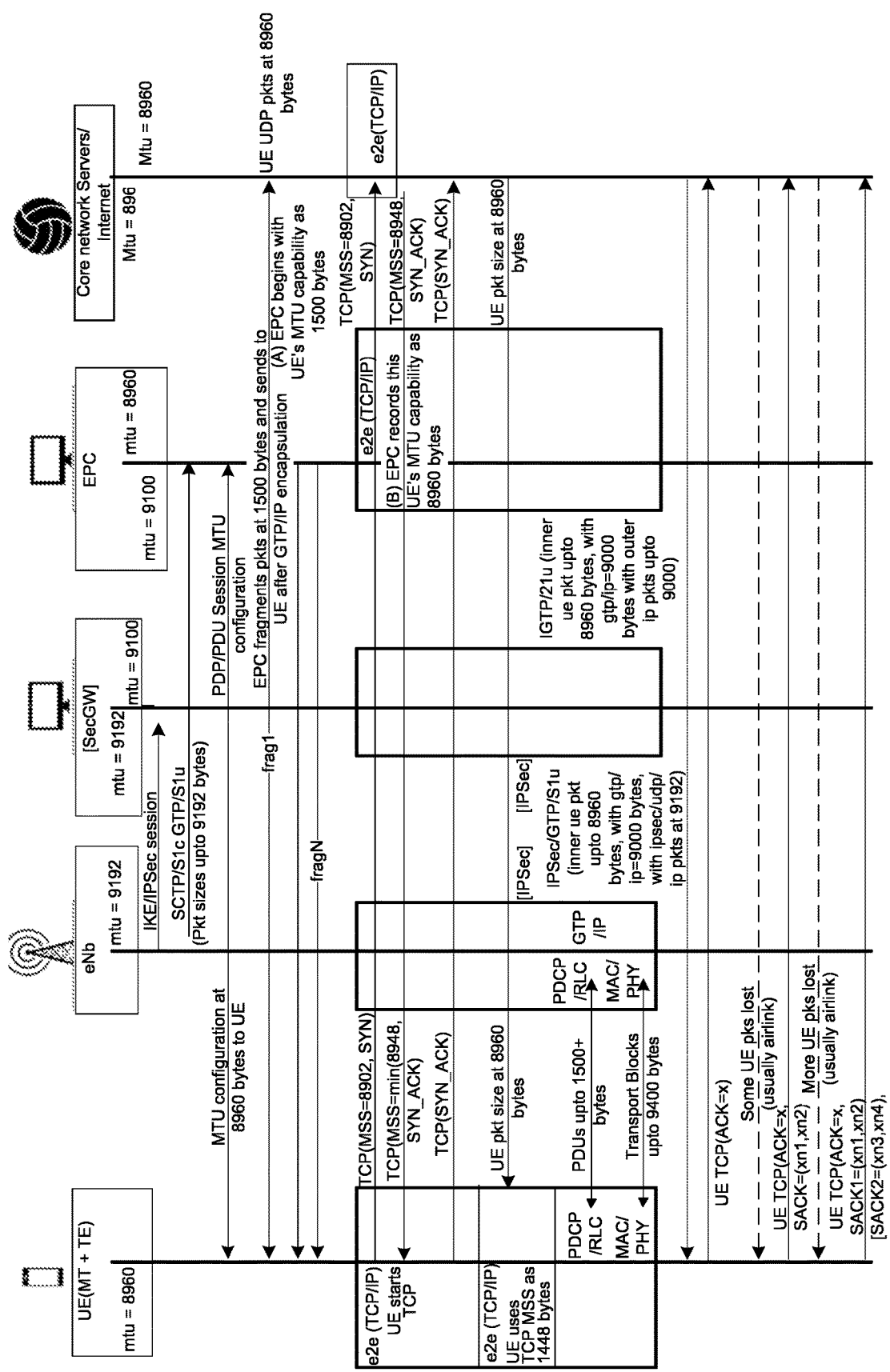
FIG. 11 is a simplified illustration of TCP transactions in which TCP-SACK has been introduced to efficiently handle the re-transmissions.

FIG. 4 is an illustration of a system in which the MTU is set based on network conditions associated with a message flow between a UE and a far end.
Packet Segmentation at the eNB/gNB Given that the channel condition estimation is done at the access point (eNB/gNB), it is quicker to adapt to these estimations for setting the MTU in the AP. The core network sends the IP packets to the AP and the IP packets are segmented and applied for transmission, adapting MTU size at the AP. Similar functions can be performed at the modem and HLOS layers on the UE side.
Mobility Support with Packet Segmentation Given that the IP packet segments are transmitted on the wireless link when the MTU size requirement on the wireless link is smaller than the IP packets received, the transitions across eNBs accommodate the IP packet segments and not just the whole IP packets. Note that each IP packet segment is associated with an independent PDCP header and for the RAN L2 layers, these IP packet segments are treated as whole IP packets. These segments are reassembled at the receiver side IP layer.

The packet forwarding during mobility across APs is supported by forwarding to the target AP the IP segments that could not be delivered over the source AP separate from the whole IP packets. This offers a just-in-time fragmentation that adapts to radio channel conditions while avoiding repeating IP segments that already completed transmission.
Preestablishing Dedicated Bearers that Support Specific MTU Sizes One method of managing MTU size-based operation across the EPC core network, AP, and UE is to establish default and dedicated bearers that accommodate specific MTU sizes. Based on the IP flow, the traffic can be routed to the appropriate bearer. This adaptation can be done taking UE channel conditions estimations also into account. In one embodiment, all UE traffic can be supported over one bearer or the other based on the channel conditions.

The routing of the traffic to the appropriate bearer is done based on updating the Traffic Flow Templates (TFT) that provides the IP packet marking for packet selection.
Using SDAP (Service Data Adaptation Protocol) to Announce the MTU Size to Use for a Given Flow on the UL It is possible under specific scenarios that the MTU size needs to be communicated quicker than what can be accommodated by the NAS/RRC signaling messages. The SDAP layer-based communication for identifying the UL IP flow for QoS treatment based on the DL traffic can be extended to communicate the MTU size to the UE.

FIG. 5 through FIG. 11 show various data flows through a network. Discussions of these figures are presented in copending U.S. application Ser. No. 17/985,478, filed Nov. 11, 2022, entitled "Dynamic MTU Management in an Enterprise Network" and is hereby incorporated by reference in its entirety.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
a) a processor; and
b) a computer memory having a non-transitory storage media, the computer memory storing one or more instructions, which when implemented, cause the processor to
   i. determine a first size for a maximum transmission unit (MTU) for messages traveling in a first direction along a flow;
   ii. determine a second size for a maximum transmission unit for messages traveling in a second direction along the flow;
   iii. send messages in the first direction of a size that is based on the first size; and
   iv. send messages in the second direction of a size that is based on the second size.

* * * * *